(No Model.)
F. DIETZ.
CONE SECURING DEVICE FOR TUBULAR LANTERNS.
No. 309,208. Patented Dec. 16, 1884.
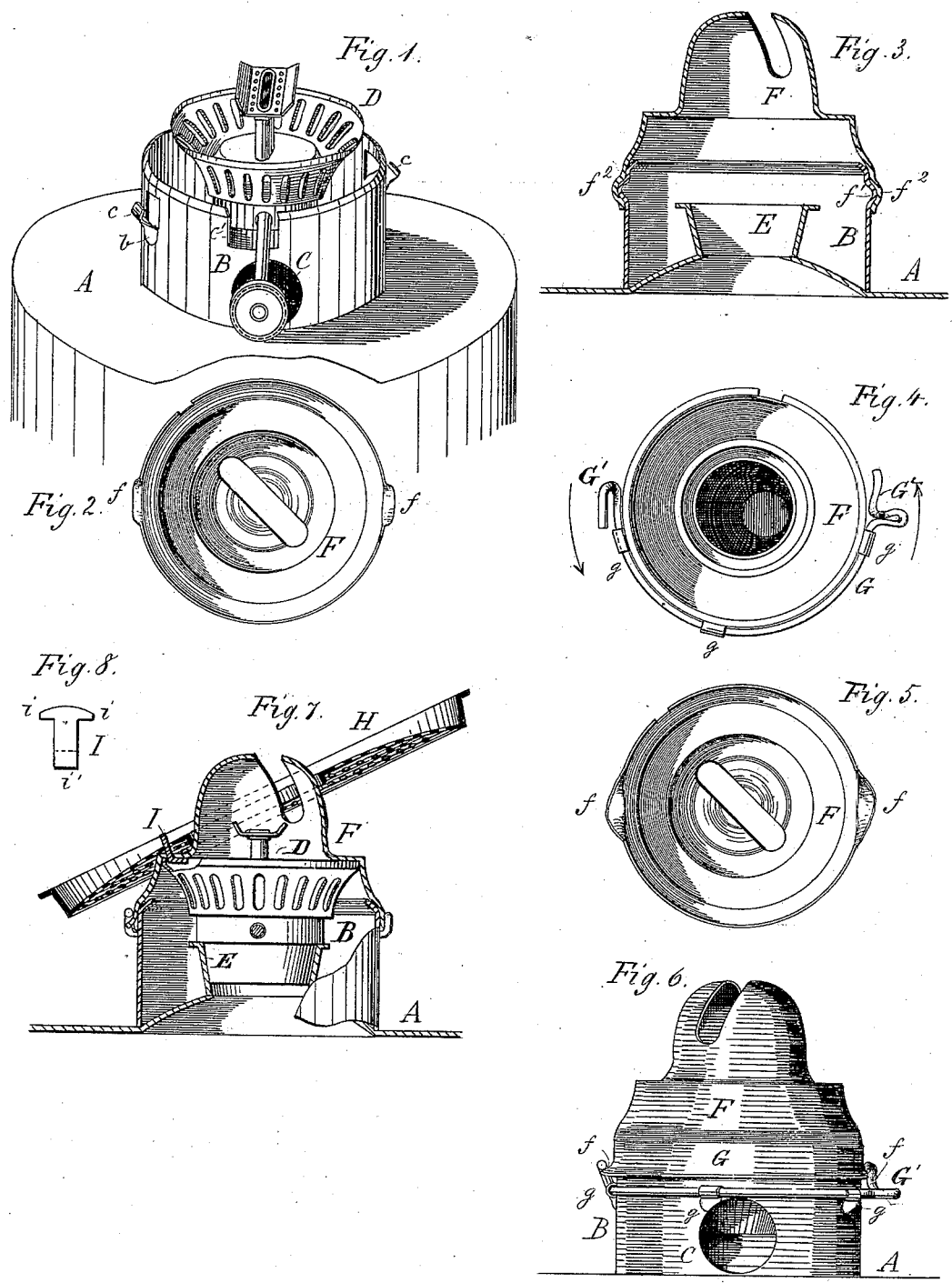
Witnesses —
Wm. A. Lowe
Edw. Ball
Inventor —
Fred. Dietz.
By A. M. Pierce
Atty.

UNITED STATES PATENT OFFICE.

FREDERICK DIETZ, OF NEW YORK, N. Y.

CONE-SECURING DEVICE FOR TUBULAR LANTERNS.

SPECIFICATION forming part of Letters Patent No. 309,208, dated December 16, 1884.

Application filed November 17, 1883. (No model.)

*To all whom it may concern:*

Be it known that I, FREDERICK DIETZ, of the city, county, and State of New York, have invented certain new and useful Improvements in Cone-Securing Devices for Tubular Lanterns, of which the following is a full, clear, and exact description, reference being had to the accompanying drawings, and to the letters of reference marked thereon.

My invention relates especially to devices for use upon tubular lanterns, and has for its object the provision of a burner-cone so constructed and arranged that when placed in position upon the air-chamber it may be rigidly secured thereto and prevent displacement of the burner.

To attain this end my invention consists, essentially, in providing the air-chamber with a catch or catches arranged to engage with the burner-cone when in position, said cone having ears formed thereon; and my invention also involves certain other novel and useful combinations or arrangement of parts and peculiarities of construction and operation, all of which will be hereinafter first fully described, and then pointed out in the claims.

In the drawings, Figure 1 is a perspective view of the oil-pot of a tubular lantern, showing the burner as placed therein, the air-chamber being provided with ears for engaging with the cone, a bottom plan view whereof is shown in Fig. 2. Figs. 3, 4, 5, and 6 are views in detail of modifications of the securing devices. Fig. 7 shows a globe-supporting plate as attached to the burner-cone, and Fig. 8 is a plan view of the pivot employed for this purpose.

Like letters of reference, wherever they occur, indicate corresponding parts in all the figures.

In the drawings, A is the oil-pot, and B the air-chamber secured thereto.

C are the perforations for the passage of the air-tubes.

In Fig. 1 the metal of the air-chamber is cut away and bent outward at $c\ c$, forming catches adapted and arranged to engage with the burner-cone. When thus formed, strength and security may be added to the catches by placing a small portion of solder, $b$, at the base thereof. The burner D slips into the supporting-ring E, affixed to the oil-pot in the usual manner, and the air-chamber may be cut away at $c'$ to permit a slight turning of the burner upon its seat when the cone is locked in place.

F is the burner-cone, provided with ears $f$, formed by bending the metal outward at the bottom edge. When the air-chamber is arranged as shown in Fig. 1, the burner is first placed in the position shown in said figure, the cone fitting thereover in the usual manner, and then by giving said cone a slight turn to the left the ears $f$ pass under the catches $c$, securely locking the cone in place and holding the burner in position without the pressure of the globe.

In the modification shown in Fig. 3 the metal of the air-chamber is pressed outward at $f'$, and that of the cone at $f^2$, forming a catch for holding the parts in place.

In Figs. 4 and 6 the air-chamber is provided with a wire slide, G, passing partially there-around, being secured thereto by eyes $g$. Said slide is provided with a thumb-piece, G', for operating, and with fingers $G^2$, which catch over the ears $f$ upon the cone when said cone is placed upon the air-chamber and the slide turned to one side.

In order to secure the globe-supporting plate against displacement when the globe is removed from the lantern, and to permit the tipping of the globe and plate when it is desired to remove the globe, I pivot the plate H to the burner-cone, preferably by means of a tongue, I, formed as shown in Fig. 8. A slit is made in the plate, and a corresponding one in the cone, through which the tongue is passed, the wings $i$ resting upon the upper surface of plate H, and the lower extremity, $i'$, being turned at right angles to the body upon the inside of the cone, where it may be secured. By this construction the plate is free to tip upward, as shown, and as the burner-cone is locked to the air-chamber there is no danger of loosing the plate therefrom when the globe is removed.

Having now fully described my invention, what I claim as new therein, and desire to secure by Letters Patent, is—

1. In a tubular lantern, the combination, with the air-chamber, a seat within the same, and a slip-burner fitted to said seat, of the burner-cone having a portion of its side distended laterally to form an ear, and a catch on the side of the air-chamber to engage with said ear to hold the cone to said chamber, and thereby secure the burner within the chamber, substantially as and for the purpose set forth.

2. In a tubular lantern, the combination, with the air-chamber B, having catches $c$ formed integral therewith, and the slip-burner D, of the cone F, provided with ears $f$, formed by a distended portion of the cone, substantially as and for the purpose set forth.

3. The combination, with the air-chamber, slip-burner, and burner-cone locked to the air-chamber to hold the slip-burner therein, of the globe-supporting plate pivoted to the burner-cone by means of a tongue passing through both plate and cone, substantially as and for the purpose set forth.

4. In a tubular lantern, the combination of the air-chamber provided with a locking-catch on its side, a seat within said chamber, a slip-burner fitted to said seat, and the cone provided with an ear on its side to lock with the catch on the side of the air-chamber, substantially as and for the purpose set forth.

In testimony that I claim the foregoing I have hereunto set my hand in the presence of two witnesses.

FREDERICK DIETZ.

Witnesses:
EUGENE N. ELIOT,
A. M. PIERCE.